United States Patent
Wu

(10) Patent No.: US 12,057,960 B2
(45) Date of Patent: Aug. 6, 2024

(54) METHOD FOR NOTIFYING A MESSAGE OF A SMART HOME BASED ON A SMART SCREEN APPARATUS AND SMART SCREEN

(71) Applicant: SHENZHEN SKYWORTH-RGB ELECTRONIC CO., LTD., Guangdong (CN)

(72) Inventor: Tao Wu, Guangdong (CN)

(73) Assignee: SHENZHEN SKYWORTH-RGB ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 17/915,515

(22) PCT Filed: Oct. 30, 2020

(86) PCT No.: PCT/CN2020/125540
§ 371 (c)(1),
(2) Date: Sep. 29, 2022

(87) PCT Pub. No.: WO2021/196586
PCT Pub. Date: Oct. 7, 2021

(65) Prior Publication Data
US 2023/0121623 A1    Apr. 20, 2023

(30) Foreign Application Priority Data

Apr. 2, 2020   (CN) .......................... 202010256668.8

(51) Int. Cl.
*H04L 12/28*   (2006.01)
(52) U.S. Cl.
CPC ................ *H04L 12/2823* (2013.01)

(58) Field of Classification Search
USPC ......................................... 709/238
See application file for complete search history.

(56) References Cited

U.S. PATENT DOCUMENTS 11,544,924 B1 *   1/2023   Lee .................. G08B 13/19608
2015/0109104 A1   4/2015   Fadell et al.
(Continued)

FOREIGN PATENT DOCUMENTS

CN    103970081 A    8/2014
CN    105407022 A    3/2016
(Continued)

OTHER PUBLICATIONS

The EESR of family EP patent application No. 20929204.4 issued on Jul. 27, 2023.

*Primary Examiner* — Kevin S Mai
(74) *Attorney, Agent, or Firm* — Samson G. Yu

(57) ABSTRACT

Disclosed in the embodiments of the present disclosure are a method for notifying a message of a smart home based on a smart screen, an apparatus, and a smart screen. The method includes: receiving a notification message sent by a smart home device waiting to be processed by a user; determining, by means of a communication component of a smart screen, a first smart home device closest to the smart screen, so as to determine a location of the smart screen by means of the first smart home device; and starting infrared detectors installed in respective rooms, determining, according to a location of the user acquired by an infrared detector, a second smart home device closest to the user, and then using the second smart home device to send the notification message and the location of the smart screen to the user.

14 Claims, 3 Drawing Sheets

(56) References Cited

U.S. PATENT DOCUMENTS

| | | | |
|---|---|---|---|
| 2016/0360344 A1 | 12/2016 | Shim et al. | |
| 2018/0286109 A1* | 10/2018 | Woo et al. | |
| 2020/0275266 A1* | 8/2020 | Jakobsson | H04W 4/90 |
| 2021/0176086 A1* | 6/2021 | Izu | H04L 12/2825 |

FOREIGN PATENT DOCUMENTS

| | | |
|---|---|---|
| CN | 105739320 A | 7/2016 |
| CN | 106094545 A | 11/2016 |
| CN | 106303126 A | 1/2017 |
| CN | 106572152 A | 4/2017 |
| CN | 109725619 A | 5/2019 |
| CN | 109944019 A | 6/2019 |
| CN | 110264685 A | 9/2019 |
| CN | 110398898 A | 11/2019 |
| CN | 111447125 A | 7/2020 |
| EP | 3383013 A1 | 10/2018 |
| IN | 109541959 A | 3/2019 |
| WO | 2018136172 A1 | 7/2018 |

\* cited by examiner

METHOD FOR NOTIFYING A MESSAGE OF A SMART HOME BASED ON A SMART SCREEN APPARATUS AND SMART SCREEN

CROSS-REFERENCE TO RELATED APPLICATION

The present disclosure claims the priority of Chinese patent application no. 2020102566688, filed with the China National Intellectual Property Administration on Apr. 2, 2020 and entitled "method for notifying a message of a smart home based on a smart screen, Apparatus and Smart screen", which is incorporated herein by reference in its entirety.

TECHNICAL FIELD

The present disclosure relates to the field of smart home, and in particular, to a method for notifying a message of a smart home based on a smart screen, apparatus and a smart screen.

BACKGROUND

With the development of Artificial Intelligence & Internet of Things (AIOT), more and more smart home devices are intelligentized. At present, a smart home ecological architecture basically uses a router as a smart home gateway, and a terminal device such as a mobile phone, a tablet, and a computer as a control terminal of the smart home, and forms a smart home system together with a smart home device.

Existing home users are mostly intelligent. For example, kitchen appliances such as a soybean milk machine and an electric cooker all have a reservation function, and when working is completed, a prompt tone is issued to remind the user that working has been accomplished; and appliances such as a washing machine not only issue a prompt tone but also is automatically powered off when working is completed. Although the described smart home devices greatly simplify the usage process of the user, when a smart home device issues a prompt tone, the user, if far away from the smart home device, cannot acquire the message notification of the smart home device in time, thus causing waste of energy, and being not conducive to the intelligentization development of smart home.

SUMMARY

According to a first aspect of the present disclosure, an embodiment of the present disclosure provides a method for notifying a message of a smart home based on a smart screen, the method includes:
 a notification message is received, which is sent by a smart home device waiting to be processed by a user;
 a first smart home device closest to the smart screen is determined by means of a communication component of a smart screen, so as to determine a location of the smart screen by means of the first smart home device; and
 a start signal is sent to infrared detectors installed in respective rooms so as to activate the infrared detectors, according to a location of the user acquired by an infrared detector, a second smart home device closest to the user is determined, and then the second smart home device is used to send the notification message and the location of the smart screen to the user.

In an embodiment, the communication component includes a communication contact, the communication contact is used for acquiring relevant information of a smart home device provided with a corresponding contact, and determining the first smart home device closest to the smart screen includes:
 when the communication contact is in contact with a smart home device provided with a corresponding contact, the smart home device connected to the communication contact serves as the first smart home device.

In an embodiment, the communication component includes an RFID identifier, each smart home device is provided with an RFID tag for recording the relevant information, and determining the first smart home device closest to the smart screen includes:
 when the communication contact is not in contact with the smart home device provided with the corresponding contact, according to the signal strength of each RFID tag received by the RFID identifier, a smart home device recorded by the RFID tag having the strongest signal strength is determined as the first smart home device.

In an embodiment, in the method, the relevant information includes first location information and device type information of the first smart home device.

In an embodiment, the method further includes:
 message source location information of the smart home device waiting to be processed by the user and second location information of the second smart home device are acquired;
 according to the message source location information and the second location information, a first distance is calculated, which is between the second smart home device and the smart home device waiting to be processed by the user, and a second distance between a first smart home device and the second smart home device is calculated according to the first location information and the second location information; and
 the first distance is compared with the second distance, and a comparison result is sent to the user by using the second smart home device.

In an embodiment, in the method, the infrared detectors installed in the respective rooms include infrared detectors installed at specified locations in the respective rooms.

In an embodiment, in the method, the infrared detectors installed in the respective rooms include infrared detectors integrated in smart home devices in the respective rooms.

According to a second aspect of the present disclosure, an embodiment of the present disclosure provides a smart screen-based smart home message notification apparatus, the apparatus includes:
 a receiving component configured to receive a notification message sent by a smart home device waiting to be processed by a user;
 a positioning component configured to determine, by means of a communication component of a smart screen, a first smart home device closest to the smart screen, so as to determine a location of the smart screen by means of the first smart home device; and
 a control component configured to send a start signal to infrared detectors installed in respective rooms so as to activate the infrared detectors, determine, according to a location of the user acquired by an infrared detector, a second smart home device closest to the user, and then use the second smart home device to send the notification message and the location of the smart screen to the user.

According to a third aspect of the present disclosure, an embodiment of the present disclosure provides a smart screen, including a memory and a processor, wherein the memory is used for storing a computer program, and the processor runs the computer program, so that the smart screen executes the method above.

In an embodiment, the smart screen further includes a communication component, and the communication component further includes a communication contact; and the communication contact is in contact communication with a smart home device includes a corresponding contact, and the smart home device is controlled by the smart screen by means of the communication contact.

In an embodiment, the communication component is further configured to determine the first smart home device closest to the smart screen, so as to determine a location of the smart screen by means of the first smart home device, wherein the first smart home device is a smart home device which is connected to the smart screen by means of the communication contact and closest to the smart screen.

In an embodiment, the smart screen writes initial configuration information into the first smart home device by means of the communication contact.

In an embodiment, the communication component further includes an RFID identifier, each smart home device is provided with an RFID tag for recording relevant information;

the RFID identifier is configured to receive a signal of each RFID tag; and the smart screen is configured to determine, according to the signal strength of each signal, a smart home device recorded by the RFID tag having the strongest signal strength as the first smart home device.

In an embodiment, the relevant information includes first location information and device type information of the first smart home device.

The present disclosure also relates to a readable storage medium storing a computer program, which when run on a processor, executes the method above.

BRIEF DESCRIPTION OF THE DRAWINGS

To describe the technical solutions of the present disclosure more clearly, the following briefly introduces the drawings required for describing the embodiments. It should be understood that the following drawings illustrate only some embodiments of the present disclosure and are not intended to limit the scope of protection of the present disclosure. Similar constituents are indicated in similar numbers in the various figures.

Figure 1:
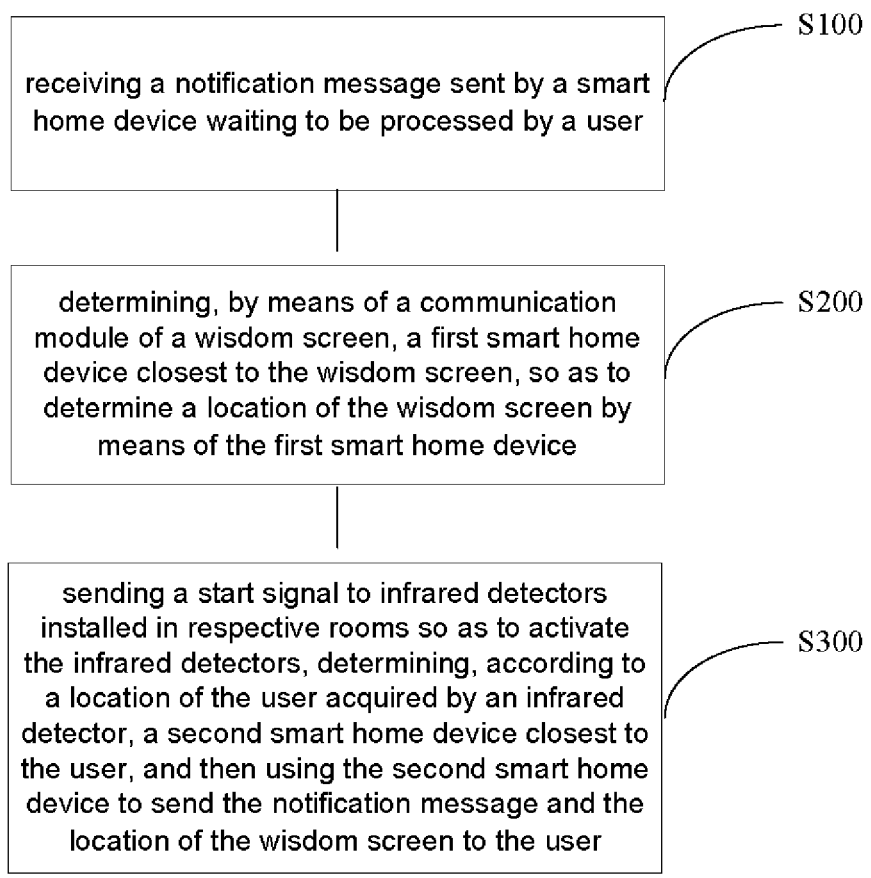
FIG. 1 illustrates a schematic flow diagram of a method for notifying a message of a smart home based on a smart screen according to an embodiment of the present disclosure.

ILLUSTRATION OF KEY MEMBER SIGNS:

1—smart screen-based smart home message notification apparatus; 100—receiving component; 200—positioning component; and 300—control component.

DETAILED DESCRIPTION OF THE EMBODIMENTS

The following clearly and completely describes the technical solutions in the embodiments of the present disclosure with reference to the drawings in the embodiments of the present disclosure. Obviously, the described embodiments are merely some rather than all of the embodiments of the present disclosure.

Generally, the components in the embodiments of the present disclosure described and illustrated in the drawings herein may be arranged and designed in a variety of different configurations. Therefore, the following detailed description of embodiments of the present disclosure provided in the drawings is not intended to limit the scope of the claimed present disclosure, but is merely representative of selected embodiments of the present disclosure. Based on the embodiments of the present disclosure, all other embodiments obtained by those skilled in the art without any inventive effort belong to the scope of protection of the present disclosure.

Hereinafter, the terms "include", "have" and their cognate words which may be used in various embodiments of the present disclosure are intended to mean only the specified features, numbers, steps, operations, elements, components, or combinations of the foregoing, and should not be construed to first preclude the presence or add the possibility of one or more other features, numbers, steps, operations, elements, components, or combinations of the foregoing.

In addition, the terms "first", "second", "third", and the like are used only for distinguishing descriptions, and cannot be understood as indicating or implying relative importance.

Unless otherwise defined, all terms, including technical terms and scientific terms, used herein have the same meanings as commonly understood by one of ordinary skill in the art to which various embodiments of the present disclosure belong. The terms, such as those defined in a generally used dictionary, will be construed to have the same meanings as contextual meanings in the related art and will not be construed to have idealized or overly formal meanings unless clearly defined in the various embodiments of the present disclosure.

The smart screen disclosed in the present disclosure is provided with a communication contact at a specified location, and the communication contact can be used for contact communication with a smart home device provided with a corresponding contact. Exemplarily, the smart screen provided with a communication contact can be adsorbed, by means of the communication contact, onto any smart home device provided with a corresponding contact, and then the smart home device is controlled by means of the smart screen.

This embodiment, with reference to FIG. 1, illustrates a schematic flow diagram of a method for notifying a message of a smart home based on a smart screen. As shown in FIG. 1, the method includes the following steps:

Step S100: a notification message is received, which is sent by a smart home device waiting to be processed by a user.

When there is a certain smart home device waiting to be processed by a user, the smart home device sends a relevant notification message to a smart screen, and after the smart screen receives the notification message sent by the smart home device waiting to be processed by the user, step S200 is executed.

Exemplarily, when it is identified by a smart door lock device of room 101 on floor 1 that there is a visitor, a notification message indicating that there is a visitor is sent to a smart screen, and after the smart screen receives the notification message indicating that there is a visitor, step S200 is executed.

Step S200: a first smart home device closest to the smart screen is determined by means of a communication component of a smart screen, so as to determine a location of the smart screen by means of the first smart home device.

The smart screen determines, by means of the communication component thereof, the smart home device closest to the smart screen itself, and in this embodiment, the smart home device closest to the smart screen is referred to as the first smart home device, so as to determine the location of the smart screen according to location information of the first smart home device.

Further, the communication component includes a communication contact, and relevant information of a smart home device provided with a corresponding contact can be acquired by using the communication contact; and determining the first smart home device closest to the smart screen includes: when the communication contact of the smart screen is in contact with a smart home device provided with a corresponding contact, the smart home device connected to the communication contact serves as the first smart home device.

Further, the smart screen can acquire, by means of the communication contact, electric energy for working from the first smart home device in contact with the smart screen. It should be understood that, in the described charging manner, it is not necessary to provide a separate charging interface for the smart screen and provide a corresponding charging device, and it is only needed to provide the smart screen to be in contact with any smart home device provided with a corresponding contact, so that electric energy for working can be acquired by means of the smart home device in contact therewith. The charging manner is simple and convenient, and is beneficial to improving the user experience.

Further, the smart screen can write initial configuration information into the first smart home device by means of the communication contact. Exemplarily, when a refrigerator provided with a corresponding contact is purchased by a user, the user only needs to enable a communication contact of a smart screen to be in contact with a contact of the refrigerator, i.e. Wi-Fi account information and a password can be written into the refrigerator, and pairing information for Bluetooth pairing with the smart screen can also be written into the refrigerator, and thus initial configuration information is written, by means of the communication contact, into a smart home device in contact therewith. The complicated operations of a user searching for a device and writing an account password are simplified.

In at least one alternative embodiment, the communication component further includes a Radio Frequency Identification (RFID) identifier. Correspondingly, each smart home device is provided with an RFID tag for recording relevant information, and determining the first smart home device closest to the smart screen includes: when the communication contact of the smart screen is not in contact with the smart home device provided with the corresponding contact, according to the signal strength of each RFID tag received by the RFID identifier, a smart home device recorded by the RFID tag having the strongest signal strength is determined as the first smart home device.

Further, the relevant information includes first location information and device type information of the first smart home device. Exemplarily, the first location information of the first smart home device closest to the smart screen may indicate being located in room 303 on floor 3, and may also indicate being located in a kitchen, located in a living room, located in a master bedroom, or the like; and the device type information may be information for recording relevant functions of the smart home, such as a refrigerator, a washing machine and a smart door lock.

Step S300: a start signal is sent to infrared detectors installed in respective rooms so as to activate the infrared detectors, according to the location of the user acquired by an infrared detector, a second smart home device closest to the user is determined, and then the second smart home device is used to send the notification message and the location of the smart screen to the user.

The smart screen sends a start signal to infrared detectors installed in respective rooms so as to activate the infrared detectors, according to the location of the user acquired by the infrared detectors, a second smart home device closest to the user is determined, and then the second smart home device is used to send the notification message and the location of the smart screen to the user.

The infrared detectors installed in the respective rooms may be infrared detectors installed at specified locations in the respective rooms, and the specified locations may be appropriate installation locations selected according to the layout of the respective rooms.

The infrared detectors installed in the respective rooms may also be infrared detectors integrated in smart home devices in the respective rooms.

Exemplarily, if it is acquired by an infrared detector in room 301 on floor 3 that the user is located in room 301, the smart screen can determine a smart home device closest to the user (in this embodiment of the present disclosure, the smart home device closest to the user is referred to as a second smart home device), i.e. a second smart home device in room 301, and then use the second smart home device in room 301 to send the notification message of the smart home device waiting to be processed by the user in room 101 and the location information indicating that the smart screen is located in room 303 to the user.

According to the technical solution, a smart screen is used to receive a notification message of a smart home device, and then a smart home device closest to a user is triggered to notify the user of the location where the smart screen is currently located and a notification message to be processed. In this way, it is convenient for the user to quickly find a smart screen so that the user does not spend too much time searching for the smart screen, and the user can receive in time a notification message sent by a smart home device waiting to be processed by the user no matter where the user is located so that it can be effectively avoided that the user misses important notification messages; in addition, the user can process in time the smart home device waiting to be processed, thus reducing waste of energy.

Figure 2:
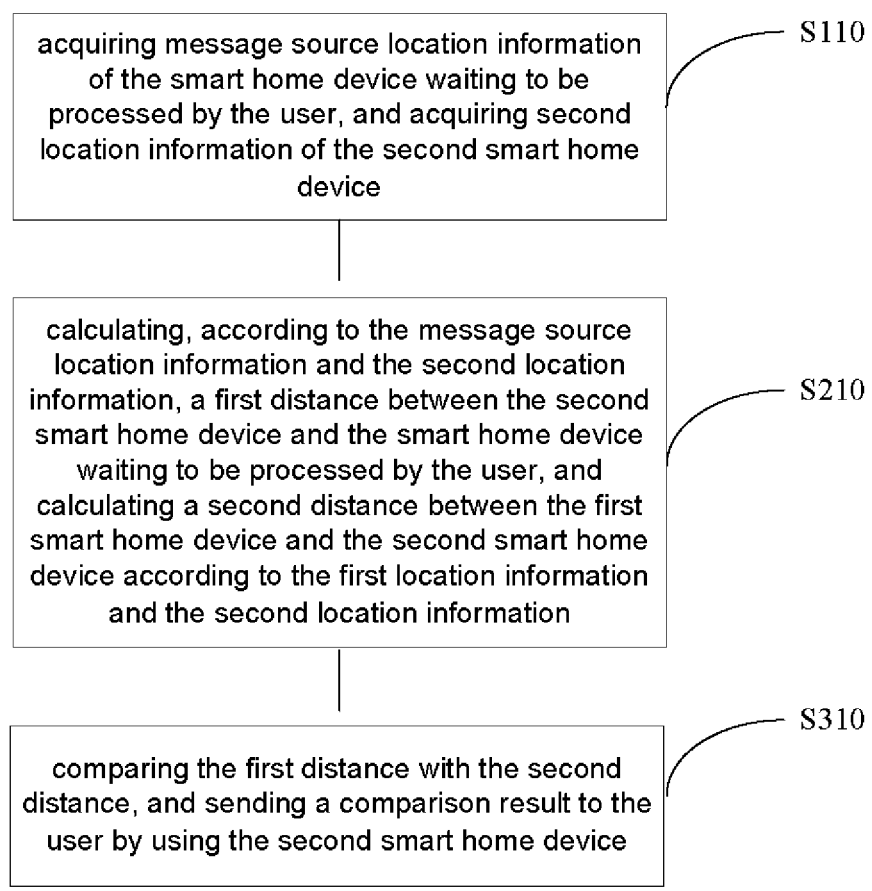
FIG. 2 illustrates a schematic flow diagram of another method for notifying a message of a smart home based on a smart screen according to an embodiment of the present disclosure.

This embodiment, with reference to FIG. 2, the method further includes the following steps:

Step S110: message source location information of a smart home device waiting to be processed by a user and second location information of the second smart home device are acquired.

It should be understood that, the message source location information is location information of a smart home device waiting to be processed by a user, the second location information is location information of the second smart home device closest to the user, and the second location information can be used for locating the location information of the user.

Step S210: according to the message source location information and the second location information, a first distance is calculated, which is between the second smart home device and the smart home device waiting to be processed by the user, and a second distance between the first smart home device and the second smart home device is calculated according to the first location information and the second location information.

It should be understood that the second location information is location information of the second smart home device closest to the user, and the first distance between the second smart home device and the smart home device waiting to be processed by the user can be used for estimating a distance between the user and the smart home device waiting to be processed by the user; the first location information is location information of the first smart home device closest to the smart screen, and the second distance between the first smart home device and the second smart home device can be used for estimating a distance between the smart screen and the user.

Step S310: the first distance is compared with the second distance, and a comparison result is sent to the user by using the second smart home device.

The smart screen compares the first distance between the user and the smart home device waiting to be processed by the user with the second distance between the smart screen and the user, and then notifies the user of a comparison result by means of the second smart home device closest to the user. This helps the user to select the fastest way to process in time the smart home device waiting to be processed by the user.

Exemplarily, when it is identified by a smart door lock device of room 101 on floor 1 that there is a visitor, a notification message indicating that there is a visitor is sent to a smart screen, and after receiving the notification message indicating that there is a visitor, the smart screen acquires, by means of a communication component thereof, first location information of a first smart home device closest to the smart screen itself indicating that the first smart home device is located in room 303 on floor 3, starts infrared detectors installed in respective rooms, and then determines, according to the location of the user acquired by an infrared detector, that a second smart home device closest to the user is located in room 301 on floor 3.

Further, the smart screen calculates a first distance between the smart door lock device waiting to be processed by the user in room 101 on floor 1 and the user located in room 301 on floor 3, and a second distance between the smart screen located in room 303 on floor 3 and the user located in room 301 on floor 3. Obviously, in this embodiment, after the smart screen compares the first distance with the second distance, the user is notified to check, by means of the smart screen located in room 303 on floor 3, visitor information and execute a corresponding door opening operation or visitor reject operation, which is convenient and fast without requiring the user to go to room 101 on floor 1 to operate the smart door lock device.

Figure 3:
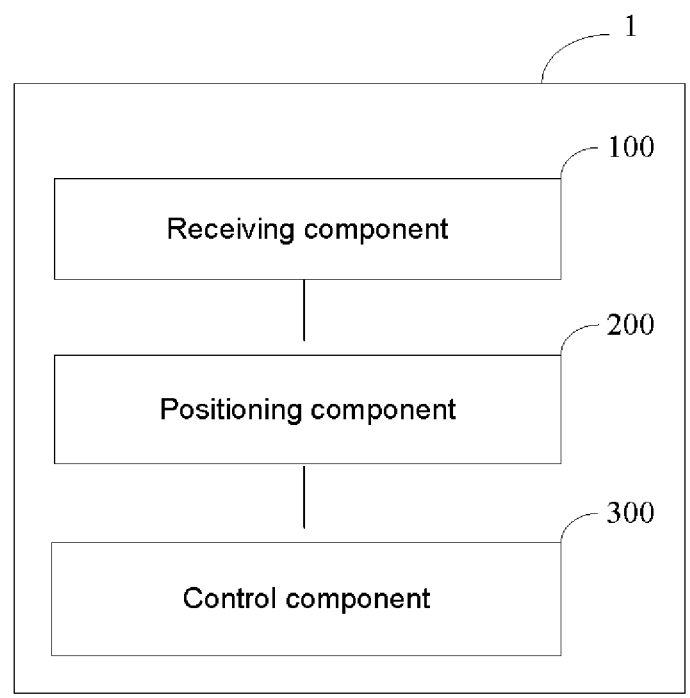
FIG. 3 illustrates a schematic structural diagram of a smart screen-based smart home message notification apparatus according to an embodiment of the present disclosure.

This embodiment, with reference to FIG. 3, illustrates a smart screen-based smart home message notification apparatus 1, the apparatus includes the following components:

a receiving component 100 configured to receive a notification message sent by a smart home device waiting to be processed by a user;

a positioning component 200 configured to determine, by means of a communication component of a smart screen, a first smart home device closest to the smart screen, so as to determine a location of the smart screen by means of the first smart home device; and a control component 300 configured to send a start signal to infrared detectors installed in respective rooms so as to activate the infrared detectors, determine, according to a location of the user acquired by an infrared detector, a second smart home device closest to the user, and then use the second smart home device to send the notification message and the location of the smart screen to the user.

The smart screen-based smart home message notification apparatus 1 according to this embodiment is used by cooperation of the receiving component 100, the positioning component 200 and the control component 300, and is used to execute the method described in the foregoing embodiments. The implementation solution and beneficial effects related to this embodiment are also applicable to relevant explanations of the smart screen in the method shown in FIG. 1 and FIG. 2, and are not repeatedly described herein.

It should be understood that, the smart screen described in the foregoing embodiment includes a memory and a processor, wherein the memory is used for storing a computer program, and the processor runs the computer program, so that the smart screen executes the method described in the foregoing embodiments.

In a possible implementation, the smart screen further includes a communication component, and the communication component further includes a communication contact.

The communication contact is in contact communication with a smart home device including a corresponding contact, and the smart home device is controlled by the smart screen by means of the communication contact.

In a possible implementation, the communication component is further configured to determine a first smart home device closest to the smart screen, so as to determine a location of the smart screen by means of the first smart home device, wherein the first smart home device is a smart home device which is connected to the smart screen by means of the communication contact and closest to the smart screen.

In a possible implementation, the smart screen writes initial configuration information into the first smart home device by means of the communication contact.

In a possible implementation, the communication component further includes an RFID identifier, each smart home device is provided with an RFID tag for recording relevant information.

The RFID identifier is configured to receive a signal of each RFID tag.

The smart screen is configured to determine, according to the signal strength of each signal, a smart home device recorded by the RFID tag having the strongest signal strength as the first smart home device.

In a possible implementation, the relevant information includes first location information and device type information of the first smart home device.

It can be understood that, the principle of the smart screen according to this embodiment is the same as the relevant explanation of the smart screen in the method shown in FIG. 1 and FIG. 2, and is not repeatedly described herein.

In the several embodiments provided in the present disclosure, it should be understood that the disclosed apparatus and method can also be implemented in other manners. The apparatus embodiment described above is merely exemplary, for example, the flow diagrams and structural diagram in the drawings show the system architecture, functionality, and operation of possible implementations of apparatus, method and computer program product according to the embodiments of the present disclosure. In this regard, each block in the flow diagrams or block diagrams may represent a component, or portion of a program segment or code, which includes one or more executable instructions for implementing the specified logical function(s). It should also be noted that, in alternative implementations, the functions noted in the blocks may occur out of the order noted in the drawings. For example, two blocks shown in succession may, in fact, be executed substantially concurrently, or the blocks may sometimes be executed in the reverse order, depending upon the functionality involved. It should also be noted that each block in the structural diagram and/or flow diagram, and combinations of blocks in the structural diagram and/or flow diagram, may be implemented by special purpose hardware-based systems that perform the specified functions or actions, or by combinations of special purpose hardware and computer instructions.

In addition, functional components in the embodiments of the present disclosure may be integrated to form an independent part, or each component may exist separately, or two or more components may be integrated to form an independent part.

If the functions are implemented in the form of software function components and sold or used as independent products, the functions may be stored in a computer readable storage medium. Based on such an understanding, the technical solutions of the present disclosure essentially, or the part making contribution to the prior art, or some of the technical solutions may be embodied in the form of a software product. The computer software product is stored in a storage medium, and includes several instructions to enable a computer device (which may be a smart phone, a personal computer, a server, a network device, or the like) to perform all or some of the steps of the method described in the embodiments of the present disclosure. The foregoing storage medium includes: any medium that can store program codes, such as a USB flash disk, a mobile hard disk, a Read-Only Memory (ROM), a Random Access Memory (RAM), a magnetic disk, or an optical disk.

The foregoing descriptions are merely specific embodiments of the present disclosure, and are not intended to limit the scope of protection of the present disclosure. Any variation or replacement readily occurred to a person skilled in the art within the technical scope disclosed in the present disclosure shall belong to the scope of protection of the present disclosure.

INDUSTRIAL APPLICABILITY

Disclosed in the embodiments of the present disclosure are a method for notifying a message of a smart home based on a smart screen, apparatus and a smart screen. The method includes: receiving a notification message sent by a smart home device waiting to be processed by a user; determining, by means of a communication component of a smart screen, a first smart home device closest to the smart screen, so as to determine the location of the smart screen by means of the first smart home device; and starting infrared detectors installed in respective rooms, determining, according to the location of the user acquired by an infrared detector, a second smart home device closest to the user, and then using the second smart home device to send the notification message and the location of the smart screen to the user. The technical solution makes it convenient for a user to quickly find a smart screen so that the user does not spend too much time searching for the smart screen, and it also can be avoided that the user misses important notification messages.

What is claimed is:

1. A method for notifying a message of a smart home based on a smart screen, comprising:
receiving a notification message sent by a smart home device waiting to be processed by a user, by a smart screen;
determining, by means of a communication component of the smart screen, a first smart home device closest to the smart screen, so as to determine a location of the smart screen by means of the first smart home device, wherein, the communication component comprises a communication contact, the communication contact is used for acquiring relevant information of a smart home device provided with a corresponding contact, and determining the first smart home device closest to the smart screen comprises: when the communication contact is in contact with a smart home device provided with a corresponding contact, the smart home device connected to the communication contact serves as the first smart home device, wherein, the relevant information comprises first location information and device type information of the first smart home device; and
sending a start signal to infrared detectors installed in respective rooms so as to activate the infrared detectors, determining, according to a location of the user acquired by an infrared detector, a second smart home device closest to the user, and then using the second smart home device to send the notification message and the location of the smart screen to the user, by the smart screen,
the method further comprising:
acquiring message source location information of the smart home device waiting to be processed by the user, and acquiring second location information of the second smart home device, by the smart screen;
calculating, according to the message source location information and the second location information, a first distance between the second smart home device and the smart home device waiting to be processed by the user, and calculating a second distance between the first smart home device and the second smart home device according to the first location information and the second location information, by the smart screen; and
comparing the first distance with the second distance, and sending a comparison result to the user by using the second smart home device, by the smart screen.

2. The method according to claim 1, wherein the communication component comprises an RFID identifier, each smart home device is provided with an RFID tag for recording the relevant information, and determining the first smart home device closest to the smart screen comprises: when the communication contact is not in contact with the smart home device provided with the corresponding contact, determining, according to the signal strength of each RFID tag received by the RFID identifier, a smart home device recorded by the RFID tag having the strongest signal strength as the first smart home device.

3. The method according to claim 1, wherein the infrared detectors installed in the respective rooms comprise infrared detectors installed at specified locations in the respective rooms.

4. The method according to claim 1, wherein the infrared detectors installed in the respective rooms comprise infrared detectors integrated in smart home devices in the respective rooms.

5. An apparatus for notifying a message of a smart home based on a smart screen, the apparatus comprising:
- a receiving component configured to receive a notification message sent by a smart home device waiting to be processed by a user, by a smart screen;
- a positioning component configured to determine, by means of a communication component of the smart screen, a first smart home device closest to the smart screen, so as to determine a location of the smart screen by means of the first smart home device, wherein, the communication component comprises a communication contact, the communication contact is used for acquiring relevant information of a smart home device provided with a corresponding contact, and determining the first smart home device closest to the smart screen comprises: when the communication contact is in contact with a smart home device provided with a corresponding contact, the smart home device connected to the communication contact serves as the first smart home device, wherein, the relevant information comprises first location information and device type information of the first smart home device; and
- a control component configured to send a start signal to infrared detectors installed in respective rooms so as to activate the infrared detectors, determining, according to a location of the user acquired by an infrared detector, a second smart home device closest to the user, and then using the second smart home device to send the notification message and the location of the smart screen to the user, by the smart screen, the apparatus is further configured to:
- acquire message source location information of the smart home device waiting to be processed by the user, and acquire second location information of the second smart home device, by the smart screen;
- calculate, according to the message source location information and the second location information, a first distance between the second smart home device and the smart home device waiting to be processed by the user, and calculate a second distance between the first smart home device and the second smart home device according to the first location information and the second location information, by the smart screen; and
- compare the first distance with the second distance, and send a comparison result to the user by using the second smart home device, by the smart screen.

6. A smart screen, comprising a memory and a processor, wherein the memory is used for storing a computer program, and the processor runs the computer program, so that the smart screen executes the method for notifying the message of the smart home based on the smart screen according to claim 1.

7. The smart screen according to claim 6, wherein the smart screen further comprises a communication component, and the communication component further comprises a communication contact; and
the communication contact is in contact communication with a smart home device comprising a corresponding contact, and the smart home device is controlled by the smart screen by means of the communication contact.

8. The smart screen according to claim 6, wherein the communication component is further configured to determine a first smart home device closest to the smart screen, so as to determine a location of the smart screen by means of the first smart home device;
wherein the first smart home device is a smart home device which is connected to the smart screen by means of the communication contact and closest to the smart screen.

9. The smart screen according to claim 7, wherein the smart screen writes initial configuration information into the first smart home device by means of the communication contact.

10. The smart screen according to claim 7, wherein the communication component further comprises an RFID identifier, each smart home device is provided with an RFID tag for recording relevant information;
the RFID identifier is configured to receive a signal of each RFID tag; and
the smart screen is configured to determine, according to the signal strength of each signal, a smart home device recorded by the RFID tag having the strongest signal strength as the first smart home device.

11. The smart screen according to claim 10, wherein the relevant information comprises first location information and device type information of the first smart home device.

12. The method according to claim 11, wherein the method further comprising:
acquiring message source location information of the smart home device waiting to be processed by the user, and acquiring second location information of the second smart home device;
calculating, according to the message source location information and the second location information, a first distance between the second smart home device and the smart home device waiting to be processed by the user, and calculating a second distance between the first smart home device and the second smart home device according to the first location information and the second location information; and
comparing the first distance with the second distance, and sending a comparison result to the user by using the second smart home device.

13. The method according to claim 6, wherein the infrared detectors installed in the respective rooms comprise infrared detectors installed at specified locations in the respective rooms.

14. The method according to claim 6, wherein the infrared detectors installed in the respective rooms comprise infrared detectors integrated in smart home devices in the respective rooms.

* * * * *